US009309597B2

(12) United States Patent
Gollerthan et al.

(10) Patent No.: US 9,309,597 B2
(45) Date of Patent: Apr. 12, 2016

(54) PROCESS FOR APPLYING A PROTECTIVE LAYER TO A TURBINE COMPONENT

(71) Applicant: Siemens Aktiengesellschaft, Munich (DE)

(72) Inventors: Susanne Gollerthan, Bochum (DE); Torsten-Ulf Kern, Wesel (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/398,462

(22) PCT Filed: Apr. 10, 2013

(86) PCT No.: PCT/EP2013/057418
§ 371 (c)(1),
(2) Date: Nov. 2, 2014

(87) PCT Pub. No.: WO2013/167334
PCT Pub. Date: Nov. 14, 2013

(65) Prior Publication Data
US 2015/0110962 A1    Apr. 23, 2015

(30) Foreign Application Priority Data

May 7, 2012    (EP) .................................... 12166937

(51) Int. Cl.
*B23K 31/02*    (2006.01)
*C23C 30/00*    (2006.01)
*B23K 35/30*    (2006.01)
*B23K 35/32*    (2006.01)
*C23C 26/02*    (2006.01)
*B23K 35/02*    (2006.01)
*B23K 1/00*    (2006.01)
*C23C 26/00*    (2006.01)

(52) U.S. Cl.
CPC ............... *C23C 30/00* (2013.01); *B23K 1/0006* (2013.01); *B23K 35/0238* (2013.01); *B23K 35/3006* (2013.01); *B23K 35/32* (2013.01); *B23K 35/325* (2013.01); *C23C 26/00* (2013.01); *C23C 26/02* (2013.01); *Y02E 20/16* (2013.01)

(58) Field of Classification Search
None
See application file for complete search history.

(56) References Cited

U.S. PATENT DOCUMENTS

| 6,534,194 | B2 | 3/2003 | Weihs et al. |
| 6,645,351 | B2 * | 11/2003 | Saint Ramond ...... C23C 14/165 204/192.15 |
| 6,736,942 | B2 * | 5/2004 | Weihs et al. ............. 204/192.12 |
| 7,063,250 | B2 | 6/2006 | Ohara et al. |
| 7,131,569 | B2 | 11/2006 | Matsu |
| 7,644,854 | B1 * | 1/2010 | Holmes ................ B23K 1/0008 228/234.3 |
| 7,724,791 | B2 * | 5/2010 | Stephens, IV .................. 372/36 |

(Continued)

FOREIGN PATENT DOCUMENTS

BE    700083 A    12/1967
CN    1205357 C    6/2005

(Continued)

*Primary Examiner* — Kiley Stoner
(74) *Attorney, Agent, or Firm* — Beusse Wolter Sanks & Maire

(57) ABSTRACT

A turbine component is provided, on which a protective layer is arranged, for example to avoid droplet impact erosion, wherein, in a first method step, a nanofilm is applied and a brazing metal is applied to the nanofilm, and the nanofilm chosen is one which, after initial ignition, leads to an exothermic reaction, whereby fusion of the brazing metal with the base material takes place to form a protective layer.

7 Claims, 2 Drawing Sheets

(56) References Cited

U.S. PATENT DOCUMENTS

| | | |
|---|---|---|
| 7,897,264 B2 | 3/2011 | Bunyan |
| 8,227,297 B2 | 7/2012 | Naundorf |
| 8,342,383 B2 * | 1/2013 | Gilman ............... B23K 1/0006 228/107 |
| 2002/0075999 A1 | 6/2002 | Rother |
| 2003/0164289 A1 * | 9/2003 | Weihs et al. ............. 204/192.12 |
| 2004/0091627 A1 * | 5/2004 | Ohara et al. ................. 427/402 |
| 2005/0051607 A1 * | 3/2005 | Wang et al. .................... 228/246 |
| 2005/0082343 A1 * | 4/2005 | Wang et al. .................... 228/115 |
| 2005/0136270 A1 * | 6/2005 | Besnoin et al. .............. 428/469 |
| 2005/0161494 A1 | 7/2005 | Matsu et al. |
| 2006/0219759 A1 * | 10/2006 | Duckham et al. .......... 228/234.3 |
| 2006/0220223 A1 * | 10/2006 | Lu ...................... B81C 1/00269 257/704 |
| 2007/0017958 A1 | 1/2007 | Hasz et al. |
| 2007/0235500 A1 * | 10/2007 | Suh et al. ....................... 228/101 |
| 2007/0257364 A1 * | 11/2007 | Van Heerden et al. ........ 257/737 |
| 2008/0006528 A1 * | 1/2008 | Gilman et al. ............ 204/298.12 |
| 2008/0110962 A1 * | 5/2008 | Saxena et al. ................ 228/123.1 |
| 2009/0078470 A1 * | 3/2009 | Lyons et al. ................... 175/435 |
| 2009/0173626 A1 * | 7/2009 | Duckham et al. ......... 204/298.13 |
| 2009/0186195 A1 * | 7/2009 | Spraker et al. ................ 428/172 |
| 2010/0269975 A1 * | 10/2010 | Brice .................. B23K 1/0006 156/73.1 |
| 2011/0031301 A1 * | 2/2011 | Segletes et al. ............... 228/198 |
| 2011/0049729 A1 | 3/2011 | Naundorf |
| 2011/0114705 A1 * | 5/2011 | Matis ........................... 228/121 |
| 2011/0135956 A1 * | 6/2011 | Gunturi ............... B23K 1/0008 428/660 |
| 2011/0299800 A1 * | 12/2011 | Seufert et al. .................. 384/50 |
| 2012/0082176 A1 * | 4/2012 | Ou .......................... H01L 23/36 372/36 |
| 2012/0266770 A1 * | 10/2012 | Smith et al. ................... 102/205 |
| 2014/0210110 A1 * | 7/2014 | Smith ........................... 257/779 |

FOREIGN PATENT DOCUMENTS

| | | |
|---|---|---|
| CN | 1623077 A | 6/2005 |
| DE | 102009015502 A1 * | 10/2007 |
| DE | 102010004193 A1 | 7/2011 |
| EP | 1391537 A1 | 2/2004 |
| EP | 1498682 A1 | 1/2005 |
| GB | 1141247 A | 1/1969 |
| JP | 2001099660 A | 4/2001 |
| JP | 2004501047 A | 1/2004 |
| JP | 2005133715 A | 5/2005 |
| JP | 2009530867 A | 8/2009 |
| WO | 2009133105 A | 11/2009 |
| WO | 2009133105 A1 | 11/2009 |
| WO | 2011000348 A1 | 1/2011 |

* cited by examiner

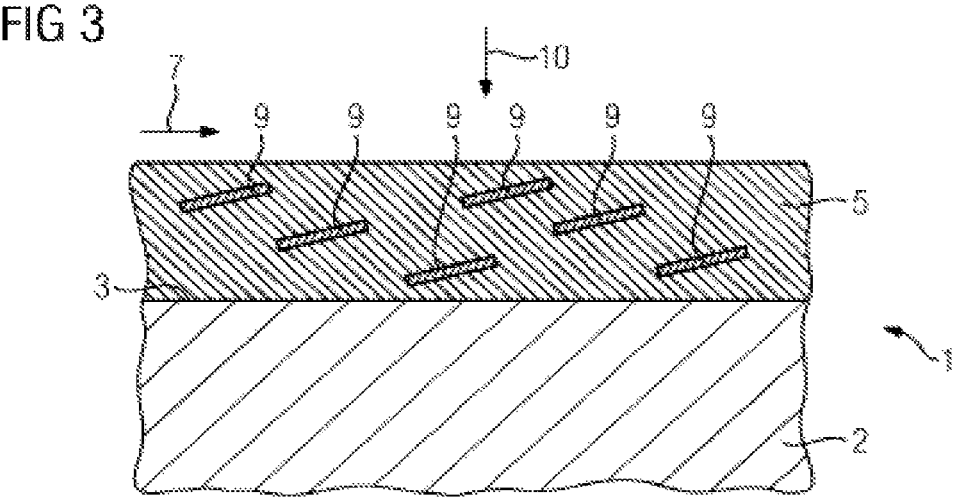
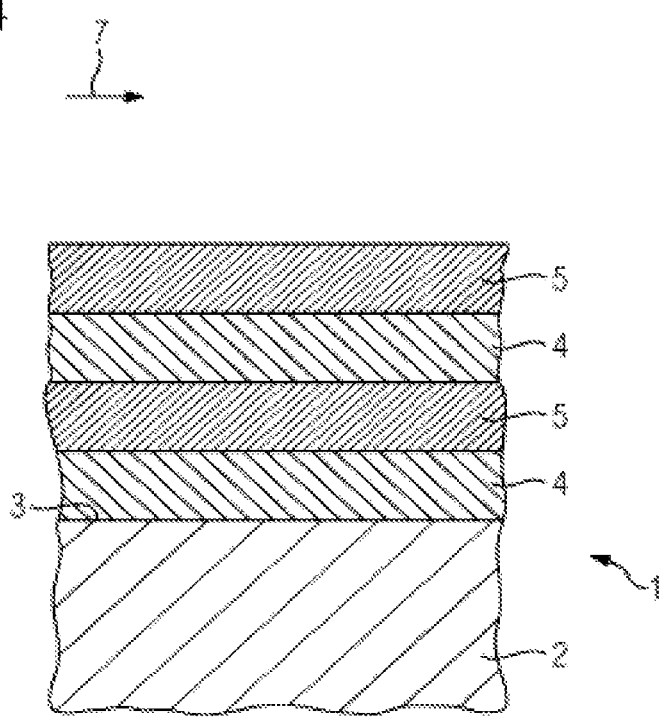

PROCESS FOR APPLYING A PROTECTIVE LAYER TO A TURBINE COMPONENT

CROSS REFERENCE TO RELATED APPLICATIONS

This application is the US National Stage of International Application No. PCT/EP2013/057418 filed Apr. 10, 2013, and claims the benefit thereof. The International Application claims the benefit of European Application No. EP12166937 filed May 7, 2012. All of the applications are incorporated by reference herein in their entirety.

FIELD OF INVENTION

The invention relates to a process for producing a protective layer on a base material, wherein a nanofilm and a brazing metal are arranged on the base material.

BACKGROUND OF INVENTION

Thermomechanical machines, which are exposed to high temperatures, are used in steam power plants and in gas and steam turbine power plants in the field of local power supply. Steam turbines have various turbine components and are generally designed with a large volume. During operation, the aforementioned turbine components are exposed both to erosive and corrosive wear and also to mechanical wear. This constant loading of the turbine components leads to instances of material disintegration and/or to material losses. This considerably reduces the service life of the turbine components, which also has an effect on the operational reliability of the steam turbine plant as a whole. The corrosive or erosive phenomena on the turbine components are, for example, erosion corrosion, drop impingement erosion, sliding wear, rolling wear, corrosion and oxidation.

Various measures are taken in order to protect the turbine components against the aforementioned wear mechanisms. For instance, these turbine components are often provided with layers having an increased wear resistance and/or corrosion resistance compared to the base material of the turbine component. Various processes are known for applying protective layers to a base material. The following are known, inter alia: thermal spraying, brazing, CVD, PVD, electrodeposition and build-up welding.

However, on account of the properties of the turbine components, not every one of the aforementioned processes is suitable for applying a protective layer to a turbine component. By way of example, thermal spraying may not be possible on account of a complicated turbine component geometry. Furthermore, a furnace process might be excluded as a result of the in some cases very large geometries of the structural parts. Further processes may be excluded if the intention is to coat only certain locations of the turbine component rather than the entire turbine component for reasons of fatigue strength or costs. It is often the case that the aforementioned processes require space, which in some situations, e.g. during overhaul, is not present. Therefore, various processes are also excluded on account of a lack of required space. Finally, it might be the case that the aforementioned processes cannot be used if the process itself unfavorably influences the base material or gives rise to distortion, e.g. by the introduction of heat during brazing in a furnace. Therefore, it is generally the case that the turbine components are provided with a protective layer in such a manner that individual solutions are developed, leading to an optimum solution, i.e. to a suitable layer.

Solutions of this nature are, however, sometimes very costly, e.g. if it is necessary to operate with maskings or if process parameters, e.g. the brazing temperature, have to be limited so as not to influence the turbine component through a change in the base material or distortion which occurs.

SUMMARY OF INVENTION

This is where the invention is applicable. An object addressed by the invention is that of specifying a coating process which overcomes the aforementioned problems.

This object is achieved by a process for producing a protective layer as per the features of the independent claims.

According to embodiments herein, a nanofilm is applied to the base material of the turbine component. A brazing metal is arranged over said nanofilm.

In a next step, the nanofilm is locally ignited, giving rise to an exothermic reaction, which leads to fusion of the brazing metal on the base material.

A feature of the invention is accordingly the use of a nanofilm which is selected in such a manner that it exhibits an exothermic reaction when initially ignited. This means that, after initial ignition, the nanofilm gives off a relatively high temperature, with the effect that the base material is slightly partially melted and the brazing metal is completely melted. After the brazing metal and nanofilm mixture has cooled or solidified, a protective layer is formed, and this protects the turbine component against the aforementioned attacks, for example erosion or corrosion.

The nanofilm and the brazing metal can be positioned at those locations which have to be protected against corrosion or erosion. It is therefore not necessary for the entire turbine component to be formed with the coating according to the invention. This leads to a reduction in costs, since the coating of the entire turbine component is effectively avoided.

The nanofilm and the brazing metal are arranged one on top of the other, with the nanofilm being ignited locally, e.g. at the edge. This ignition can be effected by a laser beam or by the suitable transfer of energy. The exothermic reaction ends as soon as the film has been consumed. In this respect, the nanofilm has to be selected in such a manner that the locally arising heat is sufficient for exceeding the liquidus of the brazing metal material and for thereby making it possible to bond the base material and the brazing metal. The mixture of brazing metal and consumed nanofilm can itself serve as a protective layer.

Advantageous developments are indicated in the dependent claims.

Thus, in a first advantageous development, an additional protective layer is arranged on the brazing metal. A three-layer system, comprising nanofilm, brazing metal and additional protective layer, is therefore applied to the base material before the nanofilm is ignited. The material of the additional protective layer is selected here in such a manner that, after the initial ignition, the heat which arises is sufficient firstly for melting the brazing metal and secondly for establishing a bond between the brazing metal and the additional protective layer and also between the brazing metal and the base material. Here, the additional protective layer is not blended with the brazing metal and the nanofilm to form a new entity, but rather forms a protective layer on the turbine component which protects the base material against external influences.

In an advantageous development, the additional protective layer comprises a ceramic material. In the ceramic systems in question, consideration is given primarily to carbides, but also borides or the like. By way of example, it is possible to use TiC, $B_4C$, $TiB_2$ or similar compositions. In addition to ceramic particles or layers, however, consideration is also given to intermetallic phases, e.g. TiAl, or hard alloys, e.g. cobalt-based stellite.

In an advantageous development, use is made of a nanofilm having the following chemical composition: aluminum and palladium (Al/Pd), aluminum and nickel (Al/Ni), nickel oxide and nickel and aluminum (NiO—Ni/Al) and copper oxide and copper and aluminum (CuO—Cu/Al).

The nanofilm accordingly comprises at least two chemical elements arranged one on top of another in layers in the nanofilm. Thus, in the case of an aluminum and nickel nanofilm, a layer of aluminum is arranged on a layer of nickel and in turn a layer of aluminum is arranged on the nickel layer, with an alternate structure one on top of another. These layers are formed in the micrometer or in the nanometer range.

In an advantageous development, use is made of a brazing metal having the following chemical composition: $Ag_{59}Cu_{27.5}In_{12.5}Ti$; $TiCu_{15}Ni_{15}$; $TiZr_{37.5}Cu_{15}Ni_{10}$ or similar compositions.

In a further advantageous development, the process is expanded in such a manner that the nanofilm and the brazing metal are arranged in such a manner that the nanofilm hard materials which remain after the exothermic reaction are arranged in the manner of roof tiles or in the manner of fish scales.

After the initial ignition and the exothermic reaction which subsequently proceeds, a reaction product comprising intermetallic phases remains once the exothermic reaction has been completed. By way of example, in the case of a nanofilm comprising nickel and aluminum, NiAl hard materials remain, arranged in the fused brazing metal as plate-like hard materials. In this advantageous development, the nanofilm hard materials which remain should be arranged in such a manner that they have a structure in the form of roof tiles or in the form of fish scales. This means that the nanofilm hard materials are arranged hidden from view with a view to the base material. This means that an external influence on the surface of the turbine component has the effect that the nanofilm hard materials form an effective barrier with respect to the base material.

This is advantageous inter alia for a specific wear mechanism, e.g. drop impingement erosion. This is because the specific arrangement gives rise to an effectively self-protecting system, since the hard nanofilm hard materials are not rooted out by the drop impingement at the rate of globular statistically distributed particles.

In a further advantageous development, a plurality of nanofilms are arranged with a plurality of brazing metals one on top of another before the exothermic reaction. It is therefore proposed to arrange the nanofilms and the brazing metal layers alternately one on top of another. This means that firstly a nanofilm, then a brazing metal, then in turn a nanofilm and then a brazing metal are arranged alternately one on top of another. After the exothermic reaction, the nanofilm hard materials remain arranged one on top of another, leading to the aforementioned structure in the form of roof tiles or in the form of fish scales.

An advantage of the invention is that the heat generated by the nanofilm merely arises locally and the entire turbine component is not exposed to the heat. This avoids, for example, distortion of the turbine component as a consequence of different temperatures.

A further advantage of the invention is that the nanofilm can be geometrically tailored in accordance with the regions to be coated, and therefore the heat is introduced only where it is required to form the bond. This has the effect that merely local regions are formed with a protective layer according to the invention.

Furthermore, it is advantageous that the heat development has a very short duration. Furthermore, it is possible for coatings which are manufactured to size and to which the respective structural parts are applied to be positioned precisely. The nanofilm can establish bonds between materials of the same type, and this can lead to a reduction in costs.

Moreover, no external appliance, e.g. a furnace, is required, and this also has the effect that a smaller space is required for the protective layer formed according to the invention and therefore also can be readily used during servicing. The layer according to the invention can advantageously be employed primarily at inaccessible locations, since it is merely necessary to apply a film to a surface and finally a brazing metal or a ceramic material.

The invention will be explained in more detail on the basis of an exemplary embodiment.

BRIEF DESCRIPTION OF THE DRAWINGS

FIG. 3 shows a cross-sectional view of a protective layer after the exothermic reaction;

FIG. 4 shows a cross-sectional view of a turbine component before the exothermic reaction.

DETAILED DESCRIPTION OF INVENTION

Figure 1:
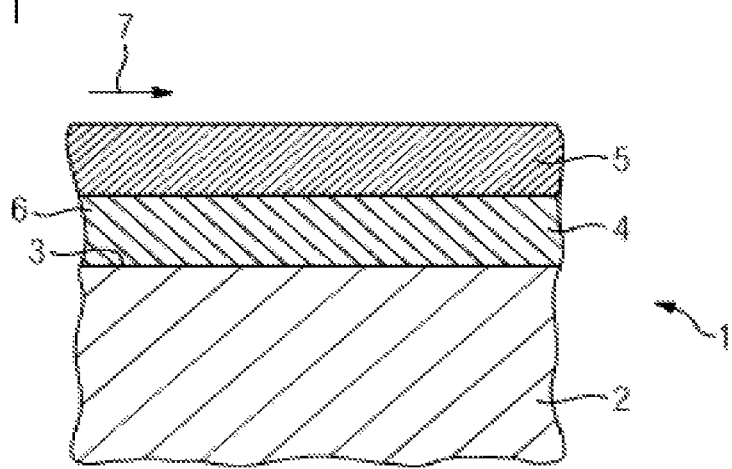
FIG. 1 shows a cross-sectional view of a layer according to the invention before the exothermic reaction.

FIG. 1 shows a turbine component 1. This turbine component 1 can be, for example, a structural part of a steam turbine, e.g. an external housing, an internal housing or a rotor. The turbine component 1 comprises a base material 2, which in steam turbine construction is usually a steel. This base material 2 has a base material surface 3, on which a nanofilm 4 is arranged in a first process step. A brazing metal 5 is applied to this nanofilm 4. The nanofilm 4 here is formed from the following chemical elements: aluminum and palladium (Al/Pd), aluminum and nickel (Al/Ni), nickel oxide and nickel and aluminum (NiO—Ni/Al) and copper oxide and copper and aluminum (CuO—Cu/Al). The brazing metal has the following chemical composition: $Ag_{59}Cu_{27.5}In_{12.5}Ti$; $TiCu_{15}Ni_{15}$; $TiZr_{37.5}Cu_{15}Ni_{10}$ or similar compositions.

In a next process step, the nanofilm 4 is ignited at an initial location 6, which can be arranged for example at an edge. This ignition is effected by a brief introduction of heat by, for example, a laser beam or by local heating. At this location, the nanofilm 4 is heated to such a great extent that the nanofilm 4 melts and as a result also causes the brazing metal 5 to melt. The generation of heat here propagates in a direction 7 along the base material surface 3. After the exothermic reaction of the nanofilm 4, the brazing metal 5 is fused to the nanofilm 4 and bonded firmly to the base material 2.

Figure 2:
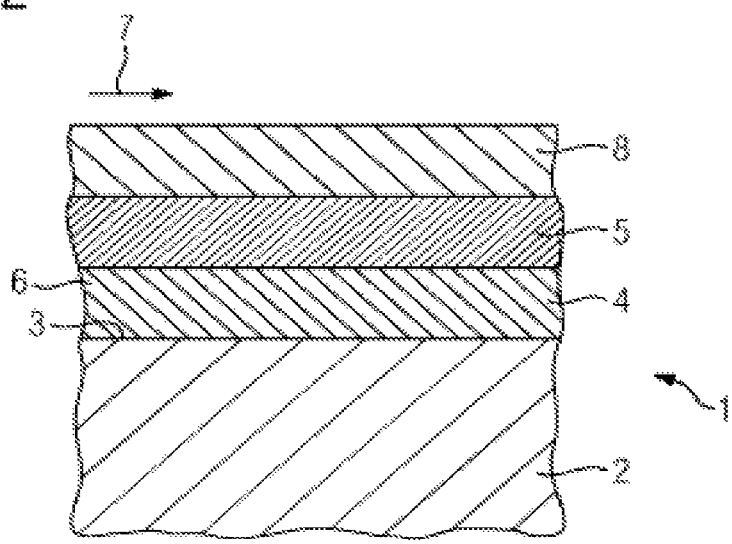
FIG. 2 shows a cross-sectional view of a turbine component before the exothermic reaction.

FIG. 2 shows an extension of the arrangement shown in FIG. 1 for producing a protective layer. In FIG. 2, a further additional protective layer 8 is arranged on the brazing metal 5 before ignition.

The production of the protective layer is effected, in a manner similar to that in FIG. 1, by ignition of the nanofilm at an initial location 6 and has the effect that heat is developed in direction 7. This has the effect that the base material 2 is locally partially melted on the base material surface 3 and a chemical bond is formed between the additional protective layer 8 via the mixture of brazing metal 5 and nanofilm 4. The additional protective layer 8 can be a ceramic protective layer having the following composition. In the ceramic systems in question, consideration is given primarily to carbides, but also borides or the like. Examples would be TiC, $B_4C$, $TiB_2$ or similar compositions. In addition to ceramic particles or layers, however, consideration is also given to intermetallic phases, for example TiAl, or hard alloys, e.g. cobalt-based stellites.

FIG. 3 shows an arrangement of the base material 2 after the exothermic reaction. Plate-like hard materials 9 remain, embedded in the fused brazing metal 5, after the exothermic reaction. Therefore, the nanofilm 4 serves in conjunction with the brazing metal 5 itself as a protective layer. In this respect, it is possible to dispense with a ceramic protective layer. The arrangement of the plate-like hard materials 9, which can be nickel-aluminum molecules for example, is such that they are arranged one above another in a viewing direction 10 orthogonal to the base material surface 3. This would then resemble an entity in the form of roof tiles or in the form of fish scales. This means that a respective end of the plate-like hard materials 9 is arranged above the other plate-like hard material 9.

FIG. 4 shows an arrangement of the nanofilm 4 and of the brazing metal 5 on the base material 2 before the exothermic reaction. The difference in the arrangement shown in FIG. 4 as compared with the arrangement shown in FIG. 1 is that here a plurality of layers of nanofilm 4 and brazing metal 5 are used. FIG. 4 shows, as an example, only one layer comprising two nanofilms 4. A plurality of layers of nanofilms 4 are also possible, however.

After the exothermic reaction, the plate-like hard materials 9 remain in the brazing metal 5 and can be arranged as shown in FIG. 3.

The invention claimed is:

1. A process for producing a protective layer on a base material, comprising:
   arranging a nanofilm directly on the base material and a brazing metal on the nanofilm,
   forming the protective layer comprising the brazing metal by locally igniting the nanofilm to start an exothermic reaction in the nanofilm that heats and fuses the brazing metal onto the base material,
   wherein the nanofilm forms nanofilm hard materials during the exothermic reaction, the method further comprising:
   arranging the nanofilm and the brazing metal in such a manner that nanofilm hard materials which remain after the exothermic reaction are arranged in the manner of roof tiles or in the manner of fish scales, and
   arranging a plurality of nanofilms with a plurality of brazing metals one on to of another before the exothermic reaction.

2. The process as claimed in claim 1, further comprising:
   arranging an additional protective layer on the brazing metal before locally igniting the nanofilm, and
   bonding the additional protective layer to the protective layer via the exothermic reaction.

3. The process as claimed in claim 2,
   wherein the additional protective layer comprises a ceramic material.

4. The process as claimed in claim 1,
   wherein the nanofilm comprises: Al/Ni.

5. The process as claimed in claim 1,
   wherein the braze metal comprises: $Ag_{59}Cu_{27.5}In_{12.5}Ti$; $TiCu_{15}Ni_{15}$ or $TiZr_{37.5}Cu_{15}Ni_{10}$.

6. The process as claimed in claim 1, wherein a turbine component of a gas turbine engine comprises the base material.

7. The process as claimed in claim 6, wherein the protective layer defines an external layer of the turbine component.

\* \* \* \* \*